United States Patent
Ladret et al.

(10) Patent No.: US 9,951,513 B2
(45) Date of Patent: Apr. 24, 2018

(54) METHOD FOR ERECTING A STRUCTURE MADE OF PREFABRICATED CONCRETE ELEMENTS AND ASSOCIATED STRUCTURE

(71) Applicant: SOLETANCHE FREYSSINET, Rueil Malmaison (FR)

(72) Inventors: Patrick Ladret, Las Matas-Madrid (ES); Vanessa Buchin-Roulie, Versailles (FR); Benoît Melen, Bois Colombes (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 14/908,400

(22) PCT Filed: Jul. 28, 2014

(86) PCT No.: PCT/FR2014/051947
§ 371 (c)(1),
(2) Date: Jan. 28, 2016

(87) PCT Pub. No.: WO2015/015103
PCT Pub. Date: Feb. 5, 2015

(65) Prior Publication Data
US 2016/0160491 A1 Jun. 9, 2016

(30) Foreign Application Priority Data
Jul. 30, 2013 (FR) ...................................... 13 57550

(51) Int. Cl.
*E04B 1/38* (2006.01)
*E04B 1/04* (2006.01)
(Continued)

(52) U.S. Cl.
CPC .............. *E04B 1/383* (2013.01); *E04B 1/043* (2013.01); *E04B 1/06* (2013.01); *E04H 12/12* (2013.01);
(Continued)

(58) Field of Classification Search
CPC . E04B 1/043; E04B 1/046; E04B 1/06; E04B 1/383; E04C 5/0645; E04H 12/12; E04H 12/16; E04H 12/34; Y02E 10/728
See application file for complete search history.

(56) References Cited

U.S. PATENT DOCUMENTS

| 1,031,050 A | * | 7/1912 | Conzelman | ........... E04H 4/0043 |
| | | | | 52/247 |
| 1,194,305 A | * | 8/1916 | McMillan | ............. E04B 1/3205 |
| | | | | 52/245 |

(Continued)

FOREIGN PATENT DOCUMENTS

| AT | 371876 B | 8/1983 |
| CA | 2762305 A1 | 11/2010 |

(Continued)

*Primary Examiner* — James M Ference
(74) *Attorney, Agent, or Firm* — Dentons US LLP

(57) ABSTRACT

The invention relates to a method for erecting a structure 0 comprising at least two prefabricated concrete elements 1, 2, the method comprising:
  installing a first concrete element 1;
  placing a second concrete element 2 with at least one spacer 4 maintaining a gap between respective end faces 104, 203 of the first element and second element;
  tensioning at least one bar 105, 3 held on the first and second elements and passing through the gap maintained by the spacer, and
  introducing a hardenable interface product 5 into said gap.
The method thus makes it possible to move off the critical path relating to the erection the need to wait, between two assembly operations, for the joints between the assembled
(Continued)

Figure 1:
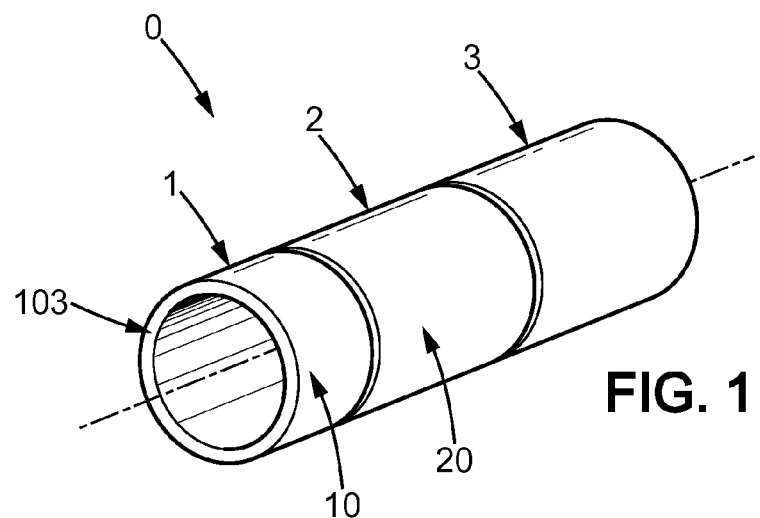

pieces to have hardened. Incidentally, a significant reduction in the time taken for erecting such a structure is obtained.

14 Claims, 5 Drawing Sheets

(51) Int. Cl.
    *E04H 12/12*     (2006.01)
    *E04H 12/16*     (2006.01)
    *E04B 1/06*     (2006.01)
    *E04H 12/34*     (2006.01)
    *E04C 5/06*     (2006.01)

(52) U.S. Cl.
    CPC ............ *E04H 12/16* (2013.01); *E04H 12/34* (2013.01); *E04B 1/046* (2013.01); *E04C 5/0645* (2013.01); *Y02E 10/728* (2013.01)

(56) References Cited

U.S. PATENT DOCUMENTS

| | | | | |
|---|---|---|---|---|
| 2,483,175 A * | 9/1949 | Billner | .................... | B28B 23/22 264/101 |
| 3,279,135 A * | 10/1966 | Jacobsen | ................. | E04B 1/043 52/127.11 |
| 3,566,560 A * | 3/1971 | Wakefield et al. | ... | E04B 1/4114 52/127.12 |
| 3,621,626 A * | 11/1971 | Tylius | ..................... | E04B 1/043 403/363 |
| 3,696,567 A * | 10/1972 | Villaneu | ................... | E04B 1/41 52/125.4 |
| 3,782,061 A * | 1/1974 | Minutoli | ................... | E04B 1/06 52/125.5 |
| 4,104,868 A * | 8/1978 | Jackson | ................... | E04H 12/12 52/249 |
| 4,145,861 A * | 3/1979 | Yarnick | ................... | E02D 27/34 52/294 |
| 4,147,009 A * | 4/1979 | Watry | ........................ | E04B 1/06 264/228 |
| 4,221,098 A * | 9/1980 | Mayer | ....................... | E04B 5/04 29/452 |
| 4,366,655 A * | 1/1983 | Mayer | ....................... | E04B 5/04 52/223.7 |
| 4,750,306 A * | 6/1988 | Granieri | ................. | E02D 27/50 52/251 |
| 4,811,536 A * | 3/1989 | Hardt | .................... | E04B 1/0007 52/250 |
| 5,038,540 A * | 8/1991 | Krautz | .................... | E04H 12/28 52/245 |
| 5,156,485 A * | 10/1992 | Ivey | .................... | E01F 15/0476 256/13.1 |
| 5,216,860 A * | 6/1993 | Thomson | ................ | E04B 1/043 52/259 |
| 5,366,672 A * | 11/1994 | Albrigo | ................. | B28B 23/043 264/219 |
| 5,386,675 A * | 2/1995 | Baur | ....................... | E04B 1/215 52/223.13 |
| 5,443,324 A * | 8/1995 | Sullivan | ................ | E01F 15/088 404/6 |
| 5,678,373 A * | 10/1997 | Franklin | .................... | E04B 2/14 52/223.7 |
| 5,732,525 A * | 3/1998 | Mochizuki | .............. | E04C 5/165 403/269 |
| 6,192,647 B1 * | 2/2001 | Dahl | ........................ | E04C 3/34 403/300 |
| 6,581,343 B1 * | 6/2003 | Metelli | .................... | E04B 7/022 403/170 |
| 6,688,071 B1 * | 2/2004 | Evers | ...................... | B21B 1/163 403/307 |
| 6,955,015 B2 * | 10/2005 | Manthei | .................... | E04B 2/06 52/223.7 |
| 7,144,186 B1 * | 12/2006 | Nolte | .................... | E01F 15/083 256/13.1 |
| 7,654,768 B1 * | 2/2010 | Tullis | ...................... | E01F 13/12 256/13.1 |
| 7,661,231 B2 * | 2/2010 | Dalton | .................... | E04B 1/161 52/236.7 |
| 7,878,730 B2 * | 2/2011 | Weaver | .................... | E04C 5/161 403/293 |
| 8,201,379 B2 * | 6/2012 | Bucheger | .................. | E04B 2/44 52/223.7 |
| 8,800,232 B1 * | 8/2014 | Keenan | .................... | E04B 1/41 14/74.5 |
| 2003/0159395 A1 * | 8/2003 | Dahl | ........................ | E04C 5/165 403/265 |
| 2004/0074171 A1 * | 4/2004 | Wobben | .................... | E04C 3/22 52/223.1 |
| 2006/0059804 A1 * | 3/2006 | Brown | .................. | E04C 5/0604 52/223.13 |
| 2008/0209842 A1 * | 9/2008 | Montaner Fraguet | .. | E04H 12/12 52/651.07 |
| 2009/0031639 A1 * | 2/2009 | Cortina/Cordero | ..... | E04H 12/12 52/40 |
| 2009/0094915 A1 * | 4/2009 | Liberman | ............... | E04B 1/215 52/293.3 |
| 2009/0139177 A1 * | 6/2009 | Holdsworth | ............ | E04B 1/043 52/713 |
| 2009/0282774 A1 * | 11/2009 | Jensen | .................... | E02D 27/42 52/698 |
| 2010/0139181 A1 * | 6/2010 | Cortina-Cordero | ..... | E04H 12/16 52/125.2 |
| 2011/0041433 A1 * | 2/2011 | He | ........................... | E01D 2/02 52/223.7 |
| 2011/0239581 A1 * | 10/2011 | Linares, III | ............. | E04B 1/043 52/699 |
| 2012/0141295 A1 * | 6/2012 | Martinez De Castaneda ............ E04H 12/085 416/244 R | | |
| 2012/0222375 A1 * | 9/2012 | He | .......................... | E01D 19/12 52/223.7 |
| 2013/0001954 A1 * | 1/2013 | Garc A Maestre | ..... | F03D 1/001 290/55 |
| 2013/0025229 A1 * | 1/2013 | Kapitza | .................... | E04H 12/12 52/583.1 |
| 2016/0160491 A1 * | 6/2016 | Ladret | .................... | E04B 1/043 52/223.6 |

FOREIGN PATENT DOCUMENTS

| | | |
|---|---|---|
| DE | 1684403 A1 | 10/1969 |
| DE | 20307595 U1 | 7/2003 |
| WO | 2006-111597 A1 | 10/2006 |
| WO | 2008-031912 A1 | 3/2008 |
| WO | 2012-168467 A2 | 12/2012 |

* cited by examiner

METHOD FOR ERECTING A STRUCTURE MADE OF PREFABRICATED CONCRETE ELEMENTS AND ASSOCIATED STRUCTURE

This application is a National Stage Application of International Application No. PCT/FR2014/051947 filed Jul. 28, 2014, which claims priority from French Patent Application No. 1357550, filed on Jul. 30, 2013, each of which are hereby incorporated by reference in their entirety.

The invention relates to a method for erecting a structure made from prefabricated concrete elements and an associated structure.

In this field, it is important to reduce as far as possible the time taken for erecting structures made from prefabricated concrete elements.

In this regard, systems and methods have already been developed.

CA 2 762 305 presents a wind-turbine mast made from prestressed concrete composed of column barrels connected in pairs by a transverse joint, each barrel being formed by prefabricated pieces forming portions of a cylinder connected together by longitudinal joints. The transverse joint is tensioned by means of high-strength steel cables inserted in conduits formed in the wall of the barrels and emerging at their ends in broadenings of the internal walls of the barrels, for joining by wet fixing anchored by overlapping, a screwed fixing or a post-tension fixing on site during the erection operations. The cables provide continuity of the prestressing throughout the mast barrels.

WO 2006/111597 A1 teaches the use of prefabricated reinforced concrete pieces for constructing the wind-turbine mast. These pieces are connected longitudinally by post-tension by means of prestressing cables inserted in conduits formed in advance in the wall of the pieces; after the application of forces to the cables, the conduits are filled with mortar. The junctions between pieces also use prefabricated methods such as a mortice and tenon joint.

WO 2008/031912 teaches the use of prefabricated panels with shearing connectors in the longitudinal joint in order to continuously transmit the tangential forces applied to the structure. It requires the injection and hardening of the joint before continuing the erection operations, which causes interruption thereof.

Generally, each transverse or longitudinal joint between two pieces is implemented by filling thereof by means of a fast-setting high-strength mortar or a mortar with microconcrete grains connected to reinforcement bars, and each transverse longitudinal joint must have set or have gained in strength in order to be able to assemble another piece to the structure. This traditional method therefore causes interruptions to the erection operations, where each interruption may be a much as 24 hours (8 hours for hardening and then 16 hours for increase in strength). Or even more depending on the climatic and/or temperature conditions.

In this context, the present invention proposes a method for erecting a structure made from prefabricated concrete elements improving the situation, and an associated structure.

The present invention aims more particularly to reduce the time taken for erecting a structure composed of prefabricated concrete elements, in particular by moving from the critical path relating to the erection the need to wait, between two assembly operations, for the joints between the assembled elements to have hardened and/or gained in strength.

The present invention also aims to allow erection under climatic conditions that are unfavourable, in particular to the hardening of the joints.

To this end, the method of the invention, moreover in accordance with the generic definition given by the above preamble, is essentially such that it comprises the following steps:

installing a first concrete element;

placing a second concrete element with at least one spacer maintaining a gap between respective end faces of the first element and second element;

tensioning at least one bar held on the first and second elements and passing through the gap maintained by the spacer, and putting a hardenable interface product in said gap.

The method thus advantageously allows tensioning of at least two prefabricated concrete elements sufficient to withstand the same forces as the hardenable interface product, whether or not hardened and/or strong, so that a third piece can be connected to the first two immediately after the tensioning step. Consequently the method advantageously makes it possible to move from the critical path relating to the structure the need to wait, between two assembly operations, for the joints between the assembled pieces to have hardened or gained in strength. Incidentally, the method according to the invention advantageously makes it possible to significantly reduce the time taken for erecting a structure made from prefabricated concrete elements.

According to one particularity, the bar comprises a first segment extending in the first element and a second segment extending in the second element, at least one of the first and second prefabricated elements having a channel disposed so as to emerge on the end face of said prefabricated element and to receive a respective segment of the bar when the second element is put in place.

According to another particularity, a hardenable sealing product is injected into the channel after the bar is tensioned in order to make the bar adhere to the concrete of the element having said channel.

Thus, once the sealing product has hardened, each bar advantageously constitutes a reinforcement bar joining the two prefabricated concrete elements.

According to another particularity, one of the first and second segments of the bar is embedded in the concrete of one of the prefabricated elements, and the other segment of the bar is fitted into said channel formed in the other prefabricated element when the second element is put in place.

According to another particularity, the first and second segments are initially two distinct pieces, the bar further comprising a coupler for assembling the first and second segments after installation of the first element.

More particularly, the first segment of the bar is embedded in the concrete of the first prefabricated element, and the coupler comprises:

a threaded coupling terminating the first segment of the bar in line with the end face of the first element; and a thread formed on the second segment of the bar, said thread being engaged in the threaded coupling in order to join the first and second segments of the bar.

According to another particularity, at least one of the first and second segments of the bar, received in a channel formed in one of the first and second prefabricated elements, has a threaded end opposite to the other segment of the bar, said threaded end being accessible after the second element is fitted and receiving a nut for assembling the first and second elements.

According to another particularity, said threaded end of a segment of the bar is accessible in a niche formed in a wall of the element comprising said channel, the niche being adjacent to the gap between said respective end faces of the first and second elements.

The method thus advantageously makes it possible to require only one operating station for the implementation and/or checking of the essential steps of the method.

According to another particularity, a hardenable sealing product is injected into the channel and into the niche after the bar is tensioned in order to make the bar adhere to the concrete of the element having said channel and to at least partially fill in the niche by coating the nut and the threaded end of the segment of the bar.

According to a first embodiment, the spacer is passive and the tensioning of the bar comprises the application of a tensile force to at least one end of the bar.

According to a particularity of the first embodiment, the bar has at least one threaded end and the tensile force is applied by tightening a nut on said threaded end.

According to a second embodiment, the first and second prefabricated elements are assembled by means of the bar, after which the tensioning of the bar comprises the application of a compression force tending to widen said gap.

According to one particularity of the second embodiment, the spacer comprises a chamber in which a fluid is injected under pressure in order to apply said compression force when the bar is tensioned.

According to another particularity, at least part of the hardenable interface product is placed in said gap when the second concrete element is fitted.

The method thus advantageously makes it possible to ensure that there is good contact between the end faces of the first element and second element over the entire surface of the spacers.

The invention also concerns a structure comprising at least two prefabricated concrete elements erected using the erection method according to any on its above particularities.

Figure 2:
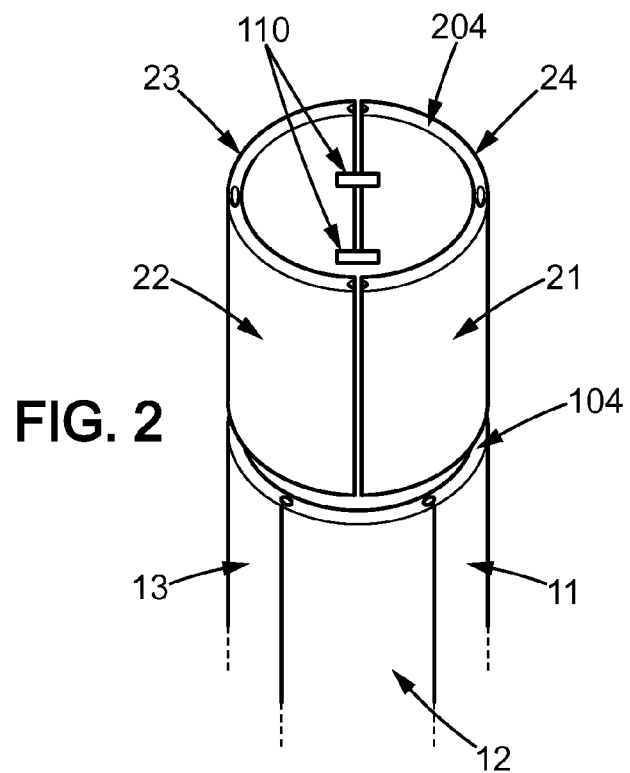
Figure 3:
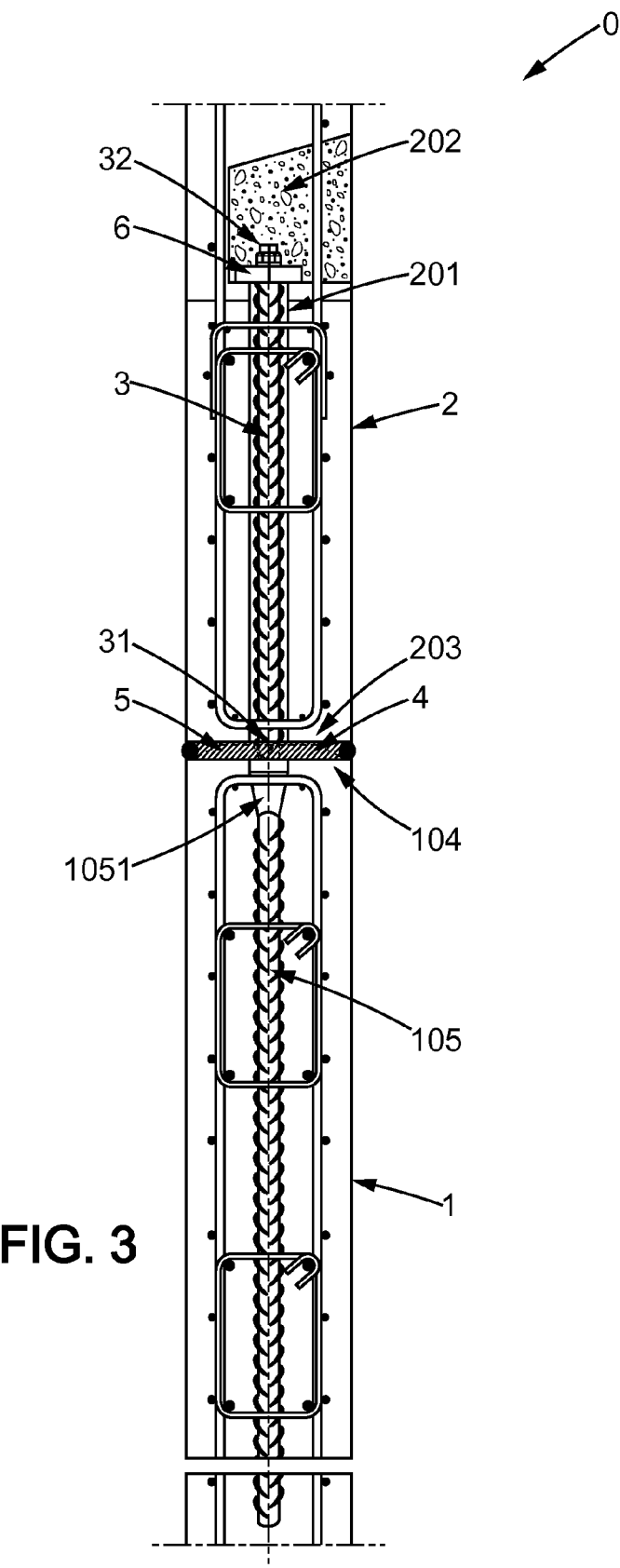
Figure 4:
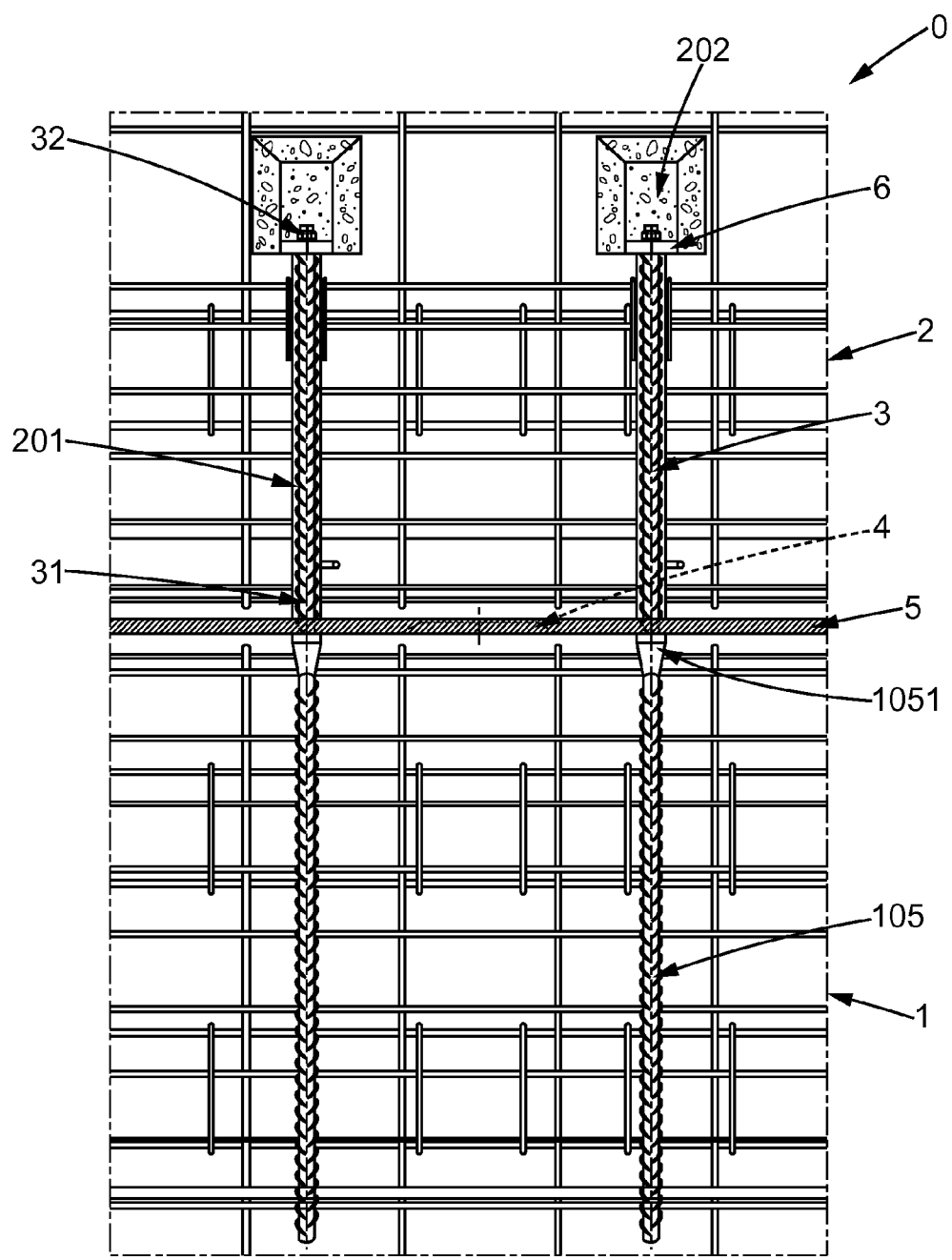
Figure 5:
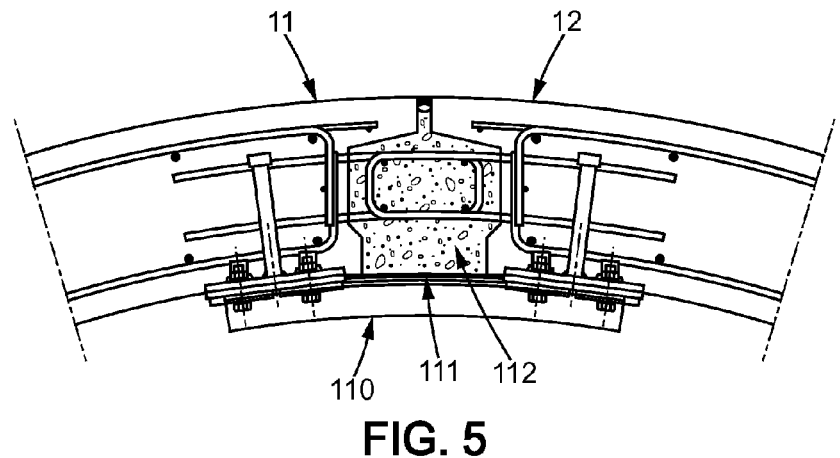
Figure 6A:
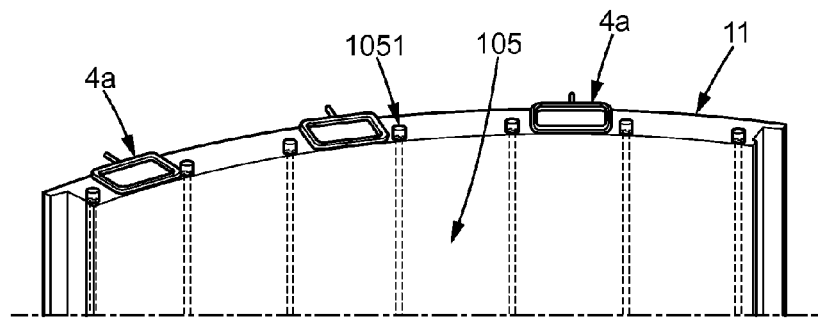
Figure 6B:
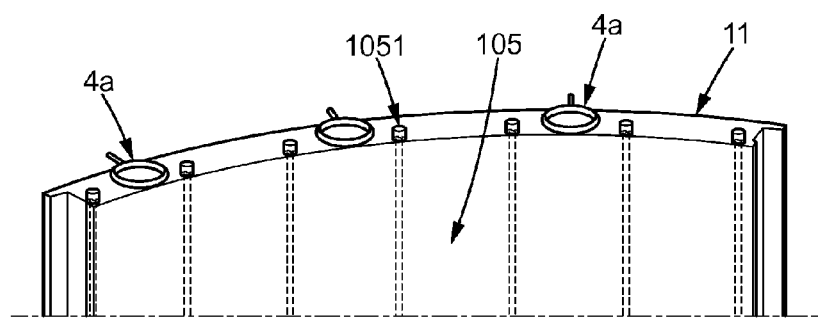
Figure 7A:
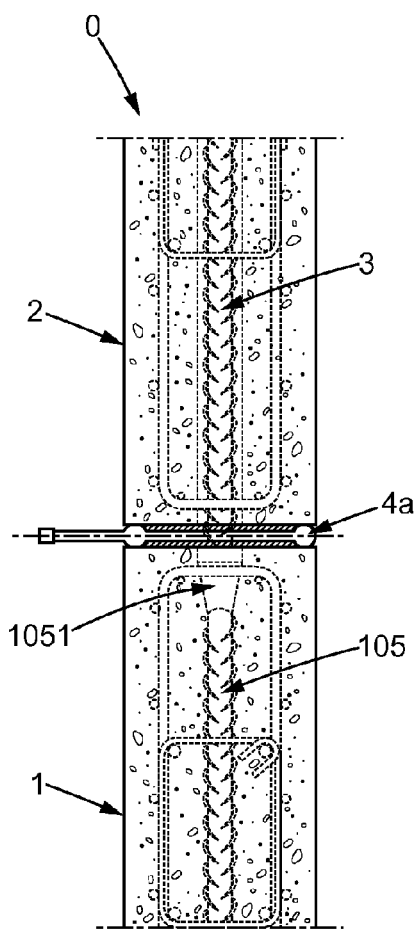
Figure 7B:
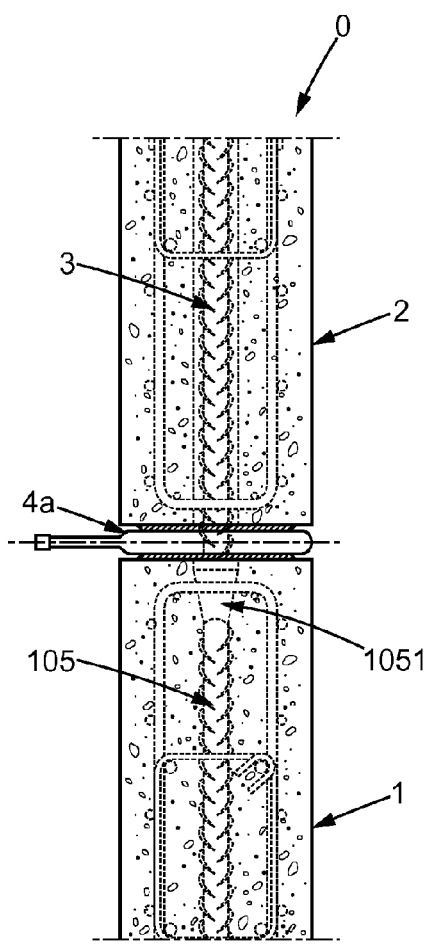

Other features and advantages of the invention will emerge clearly from the description that is given thereof below by way of indication and in no way limitatively, with reference to the accompanying drawings, in which:

FIGS. 1 and 2 illustrate two methods of erecting various elements in order to form a wind turbine mast structure, a first method consisting of assembling cylindrical pieces and a second method consisting of assembling pieces each forming a portion of a cylinder, FIG. 3 is a view in longitudinal section of a wall of the wind turbine mast assembled according to the invention, FIG. 3 illustrating more particularly a transverse junction between two pieces, FIG. 4 is a view in cross section with constant radius in the thickness of a wall of the wind turbine mast assembled according to the invention, FIG. 4 illustrating more particularly a transverse junction between two pieces, FIG. 5 is a view in transverse section of a portion of the wall of the wind turbine mast assembled according to the invention, the cross section being more particularly situated at a longitudinal junction between two pieces forming portions of a cylinder, each of FIGS. 6a and 6b is a perspective view of a piece forming a portion of a cylinder on the top edge of which a plurality of flat jacks according to the invention are disposed, the flat jacks having various forms, and each of FIGS. 7a and 7b is a view in longitudinal section of the wind turbine mast assembled according to the invention, these figures illustrating more particularly a transverse junction with a flat jack, the flat jack being respectively empty and full.

The invention is described below in its non-limitative application to the erection of a mast for a wind turbine. The invention may actually be applied to various other technical fields such as those relating to the construction of slabs, towers, tubes, reservoirs, etc., based on prefabricated concrete pieces, as well as connection reinforcements, and implementing a post-tension technique at least partially perpendicular to a junction between pieces.

As illustrated in FIGS. 1 and 2, the erection of pieces 1, 2, 3 can be achieved according to various methods, optionally combinable, which depend on the form of the pieces. By way of illustrative examples pieces with the form of a cylinder, preferentially straight, and pieces each forming a portion of this cylinder, will be considered in particular for the construction of a cylindrical mast; however, the mast may also be conical, frustoconical, with a rectangular or hexagonal cross section, etc., the pieces taking forms adapted accordingly.

The various terms below referred to as longitudinal are arranged along the generatrix of the cylindrical mast and the various terms below referred to as transverse are arranged in a plane perpendicular to this generatrix. The terms "bottom" and "top", "under" and "on", "below" and "above" used below are considered to indicate respectively the same side as the ground or a base of the mast and the same side as the sky or the top mast.

Each element or piece is prefabricated and formed from concrete, preferentially prestressed, but optionally reinforced.

In its broadest acceptance, the method for erecting a structure 0 comprising at least two of these pieces 1, 2 comprises:

installing a first piece 1;

fitting a second piece 2 with at least one spacer 4 maintaining a gap between respective end faces 104, 203 of the first piece 1 and of the second piece 2;

tensioning at least one bar 105, 3 held on the first and second elements and passing through the gap maintained by the spacer 4, and putting a hardenable interface product 5, such as mortar, in said gap.

The bar may comprise a first segment 105, hereinafter referred to as a reinforcement bar, extending in the first piece 1, and a second segment 3, hereinafter referred to as a connection bar, extending in the second piece 2. At least one of the first and second prefabricated pieces may have a channel or conduit 201 disposed so as to emerge on the end face of said prefabricated piece and to receive a respective segment of the bar when the second piece is fitted. More particularly, each conduit 201 is able to receive a connection bar 3.

By way of example, each cylindrical piece has a height H, for example approximately 20 meters. The thickness of its wall 10, 20 has conduits 201 running through it, preferentially longitudinal and distributed equidistantly. Each conduit 201 may be centred in the thickness of the wall or may be closer to the inner wall of the cylinder as illustrated in FIGS. 6a and 6b.

For example, each conduit 201 emerges more particularly on a bottom end annular surface of the cylindrical piece and extends longitudinally over at least part of its height H, and preferentially over a height less than one quarter, or even one tenth, of the height H of the piece.

As illustrated in FIGS. 3 and 4, each cylindrical piece may comprise at least one niche 202 formed in its wall 10, 20, preferentially in its internal bottom part, so that each conduit 201 emerges through one of its ends in a niche 202.

As illustrated in FIGS. 3, 4, 6a and 6b, each reinforcing bar 105 preferentially comprises at its top end a mechanical coupler 1051 coming in line with the top end annular surface 104 of the first cylindrical piece 1. The mechanical coupler is preferentially threaded.

Each connection bar 3 is preferentially produced from lightly alloyed steel and threaded at its ends. A first threaded end 31 is able to cooperate with the thread on the coupler 1051 in order to be fixed to a reinforcing bar 105; a continuity of work between each connection bar 3 and each reinforcing bar 105 is thus advantageously obtained. The second threaded end 32 of each connection bar 3 is able to form a bolt, that is to say to cooperate with a clamping nut 6 and optionally a washer.

The erection method may comprise the deposition of a plurality of spacers 4, conjointly with the bed of mortar 5 on the top end annular surface 104 of the first cylindrical piece 1. The spacers are preferentially distributed equidistantly on this surface and preferentially do not project therefrom.

In order to guarantee the correct filling of the transverse junction, a non-shrinking fluid mortar is preferentially used to form the mortar bed 5.

The spacers 4 can advantageously be leveled in order to achieve the geometric adjustment of the assembly of elements and to absorb the manufacturing tolerances of the concrete pieces. This is because, in a way that is related to the manufacturing tolerances of these pieces, each transverse joint may have a thickness that may vary objectively between 5 mm and 25 mm; and spacers of different thickness or variable thicknesses may be disposed at various points on said surface in order better to absorb these variations.

As illustrated in FIGS. 6a and 6b, the spacers 4 are more particularly disposed between two first reinforcement bars 105 adjacent to each other. This example is not limitative and the spacers may also be centred on the reinforcement bars. To this end, each spacer may comprise a through hole and be for example rectangular or annular in shape. Furthermore, the transverse joint may comprise a spacer every two consecutive gaps between reinforcement bars 105 as illustrated in FIGS. 6a and 6b, and also a spacer every gap or every three gaps, etc.

The erection method comprises the fitting of the second cylindrical piece, for example by means of a crane, above the connection bars 3. The latter are inserted by sliding into the conduits 201 of the second cylindrical piece when the latter is gradually lowered until it comes to bear on the spacers 4. It should be noted that the connection bars serve here in particular as a guide for suitable placement of the second cylindrical piece on the first.

Once the second piece is put in place, it is possible, through the niche, to screw a clamping nut 6 onto the thread of each second threaded end of the connection bars and thus to exert a longitudinal prestressed tension between the first and second cylindrical pieces.

Before bolting the second threaded end 32 of each connection bar 3, the space between each connection bar 3 and its first conduit 201 may be filled by injecting a hardenable sealing product or liquid mortar. Thus, once the mortar has hardened, each connection bar 3 advantageously constitutes a reinforcement bar.

When the prestressing tension is applied, it is also advantageously possible to check the levelling of the top end annular surface of the second cylindrical piece by tightening some of the various bolts more.

During the erection phases, the movements of the structure 0 caused by the action of winds and thermal or rheological effects create bending moments or traction and compression cycles in the transverse junction between the two cylindrical pieces. A suitable prestressing tension is sufficient to compensate for these moments or cycles and to enable the transverse junction not to experience decompression that may cause cracking thereof before hardening and/or gain in strength of said junction.

The fitting of the second cylindrical piece and the tensioning thereof are preferably carried out before hardening of the bed of mortar 5. A good contact over the entire surface of the spacers 4 is thus obtained. In order to minimise the time between the deposition of the bed of mortar 5 and the placing of the second cylindrical piece, the connection bars 3 are for example partially engaged in the conduits 201 in the second cylindrical piece, prior to said deposition.

Once the suitable prestressing tension has been applied, it is advantageously possible, by means of the method according to the invention, to assemble a third cylindrical piece on the second, without waiting for the transverse joint between the first and second pieces to have hardened and/or gained in strength. This is because the transverse joint allows, under the action of the suitable prestressing tension, the transmission of the loads applied to the structure 0 partially or completely erected whether or not the transverse joint has hardened and/or gained in strength. Furthermore, the hardening of the transverse joint depends on the assembly phase in question but not on the previous and following assembly phases.

Thus, in its broadest acceptance, the erection method makes it possible to move off the critical path the need to wait, between two assembly phases, for the joints between the pieces already assembled to have hardened and/or gained in strength before continuing the erection. Incidentally, the assembly method makes it possible to significantly reduce the erection time for a structure 0 composed of prefabricated concrete pieces.

Furthermore, the transverse joints between the cylindrical pieces are thus designed so as to transmit all the vertical reinforcement capacities in which each bar 105, 3 participates. In this way, it is possible to guarantee correct behaviour of the structure 0, even partially erected, in particular under an action simultaneously combining its bending and twisting.

The junction thus produced is able to withstand not only the forces applied to the structure during and after construction thereof, whether these forces be of external origin or related to the operations of assembling the structure, but also to the cyclic fatigue loadings (the cycles of the wind turbine blades) applied to the structure in service, without causing cracking of the joints (in accordance with the IEC 61400 and GL 2010 directives establishing the cracking limit allowable).

At least two embodiments according to the invention are envisaged depending on whether the spacers 4 are active or passive.

In the first embodiment of the method using passive spacers 4, the spacers are preferentially adhesively bonded to the top end annular surface of the first cylindrical piece and may have variable thicknesses and compositions suitable for enabling them to compress at least under the action of the prestressing tension. Subsequently to the arrangement of the spacers 4 and prior to the placing of the second cylindrical piece 2, the spacers 4 and the annular surface portion that has remained free between the spacers are covered with the bed of mortar 5.

In the second embodiment of the method using active spacers 4, each spacer consists more particularly of a chamber or pneumatic jack 4a as depicted in FIGS. 6a and 6b. The jacks are preferentially produced from thin steel plate with a geometric development capacity. They have an aperture through which a fluid, for example oil or wet mortar, can be injected, for example by means of a pump.

The assembly method according to this embodiment preferentially comprises the deposition of the bed of mortar 5 on the top end annular surface 104 of the first cylindrical piece 1, before the jacks 4a are themselves deposited on said bed, in order to create a rough foundation surface for correctly seating the jacks on this surface.

After the placing of the second piece and bolting of the second threaded end 32 of each connection bar 3, the method comprises the injection of liquid into the flat jacks 4a so as to fill them in order to confer thereon a swollen form. The force used for bolting may be minimal, since this bolting is simply intended to exert a relatively small prestressing tension, for example able to eliminate any clearance and void in the joint, so that this bolting can advantageously be carried out "by hand"; the suitable prestressing tension is therefore not caused solely by the bolting of the connection bars 3 but is related to the compression force caused by the swelling of the jacks 4a. This is because, as illustrated in FIGS. 7a and 7b, the swelling of the jacks causes a separation of the two cylindrical pieces 1, 2 from each other and, by virtue of the return force exerted by the bars 105, 3, incidentally affords the tensioning of the first and second cylindrical pieces with respect to each other.

In this second embodiment, the manufacturing tolerances of the cylindrical pieces are advantageously naturally absorbed. Furthermore, control of the filling makes it possible to ensure that a suitable prestressing tension as previously defined is achieved, but may also serve for levelling the top end annular surface 204 of the second piece 2 and the production of a geometric adjustment of the assembly of the elements, by filling some of the jacks more.

According to a variant of this embodiment, the jacks 4a consist of a porous material to enable the water wetting the mortar injected into the jacks to filter outwards and consequently to confer increased consistency on the mortar contained in the jacks.

In general terms, that is to say in a way suited to the two embodiments presented above, as the erection of the mast progresses and once the erection of the mast has been completed, the method may comprise the sealing of the joints, the tightening of the nut 6 and/or the filling of the niches 202.

The sealing of the joints consists of injecting non-shrinking quick-hardening mortar between the cylindrical pieces at the joints. The purpose of this step is to guarantee the integrity of the assembled pieces and to ensure sealing between the external environment and the internal structure of the walls of the mast, in particular so as to prevent any phenomenon of corrosion of the metal elements. The function of the mortar injected at this step is not to participate in the continuity of the transmission of the forces in the structure, whether it be partially or completely erected, this function being fully provided by the previously described transverse joints. The method therefore advantageously makes it possible to proceed with the sealing of the joints in a single phase. This also affords a significant saving in time in the erection of the mast.

Optionally, the assembly method further comprises the tightening of at least one bolt formed in the second threaded end 32 of each connection bar 3, this tightening preferentially being carried out when the joints have hardened and gained in strength so as to be carried out on a homogeneous structure.

The assembly method may also comprise the filling of the niches 202, for example with high-strength liquid mortar. This filling makes it possible firstly to prevent corrosion of the bolt and any infiltration into the conduits 201, and secondly to finish combining in the concrete the whole formed by the bar 105, 3 and the clamping nut 6 for transmission of the forces at the transverse joints and throughout the structure equivalent to what would be obtained for a structure consisting of a single block of reinforced or prestressed concrete.

According to a second assembly mode, the mode illustrated in FIGS. 2, 5, 6a and 6b, the assembly method consists, in addition to the steps described above, of assembling pieces each forming a portion of the cylinder in order to obtain a cylindrical piece. In masts constructed from pieces forming portions of a cylinder 11, 12, 13, 21, 22, 23, 24, in addition to the transverse joints as previously described, longitudinal joints between said pieces must be formed, leveled and tensioned, in particular in order to guarantee a monolithic appearance to the structure and the transmission of tangential forces through the joints.

Each piece forming a portion of a cylinder is significantly identical to a cylindrical piece as described above except that it consists of a portion of said cylindrical piece preferentially cut along at least one plane to which the generatrix of the cylindrical piece belongs. In the example illustrated in FIG. 2, each piece forms more particularly a quarter of a cylinder. Pieces forming a half-cylinder or a third of a cylinder can also be envisaged.

On the longitudinal edge of each piece forming a portion of a cylinder a shoulder can be formed, as illustrated in FIGS. 6a and 6b, so that a bearing surface between two pieces is formed on their longitudinal edge.

Temporary transverse anchoring systems 110 guarantee the holding of the pieces on each other through their bearing surfaces in order to form a cylinder. The temporary transverse anchoring systems 110 are arranged so that a minimum transverse prestressing tension is achieved. Each transverse anchoring system integrates for example connections screwed into the wall of each of the two juxtaposed pieces.

Each anchoring system 110 can also serve for holding a formwork element 111 making it possible, conjointly with a shoulder, to define, between two juxtaposed pieces, a longitudinal space portion open through its bottom and top transverse ends.

Following on from the placing of the pieces temporarily assembled with each other on a first cylindrical piece, a quick-hardening high-strength wet mortar or a microconcrete grain mortar is poured into the longitudinal space portions provided between the pieces. The top end annular surface of the first piece constitutes a formwork element closing each bottom transverse end of the longitudinal space portions.

The conjoint arrangement of the anchoring systems 110 with clamping beams makes it possible to achieve a transverse tensioning of the pieces forming portions of a cylinder sufficient for it advantageously not to be necessary to wait for the longitudinal joints to have had the time to harden and to increase their strength in order to continue the erection of the mast.

This erection method according to the second assembly method also has the same advantages as those previously described in relation to the method for erecting cylindrical pieces.

After hardening and increase in the strength of the mortar poured into the longitudinal space portion, the anchoring systems 110 and other formwork elements 111 are withdrawn and a cylindrical piece with the mechanical properties equivalent to a cylindrical piece fabricated in a single block is obtained.

The present invention also relates to the structure 0 obtained by implementing the erection method according to any one of the particularities of the method described above, in accordance with any one of the assembly modes considered or in accordance with a combination of the two assembly modes considered.

The invention is in no way limited to the threading of the mechanical coupler that is given by way of illustrative example for an engagement mechanism and may for example be replaced by a female clamping socket. Likewise, the threading of the first end 31 of each connection bar 3 is given by way of illustrative example for an engagement mechanism and may for example be replaced by a male clamping plug suited to the female clamping socket previously mentioned. Such a mechanism for engaging by clamping is for example described in the French patent document number 2970724.

The same applies to the threading of the second end 32 of each connection bar 3, which is given by way of example for the arrangement of a tensioning or post-tensioning device and may be replaced for example by a wedge-shaped spacer arranged conjointly with a slot formed in the second end 32 of each connection bar 3.

In a variant (not shown), each piece may have not a single plurality of niches 202, but two pluralities of niches, and each niche in the second plurality is formed symmetrically with a niche in the first plurality, for example with respect to a plane perpendicular to the generatrix of said piece and situated halfway up said piece.

According to this variant, two pieces may be brought one onto the other so that the niches in each of the pieces are opposite each other in order to form pairs joined by the same conduit 201. The second piece is placed on the first piece by sliding along a plurality of bars, so that the ends of each of these bars emerge in the niches in the same pair, when the first and second pieces are in contact via the transverse joint. Each end of each of the connection bars can then be bolted so as to participate in the tensioning. This variant is however more expensive.

It should be noted that, if it is proposed that the niches 202 be formed adjacent to the gap between the respective end faces 104, 203 of the first and second elements 1, 2, or more particularly in a part of wall 10, 20 of each piece that is less than one tenth of the height H of the piece, it is in particular so that a single operating station enables the steps of the erection method according to the invention to be implemented and/or checked.

The invention claimed is:

1. A method for erecting a structure comprising a first element and a second element, the first and second elements being prefabricated concrete elements, the method comprising:
   obtaining the first element;
   placing the second element with at least one spacer maintaining a gap between a face of the first element and a face of the second element;
   tensioning at least one bar fastened to the first and second elements and passing through the gap maintained by the spacer, and
   putting an interface product which is hardenable in said gap,
   wherein the bar comprises a first segment extending in the first element and a second segment extending in the second element, at least one of said first and second elements comprising a channel which leads to the face thereof, said channel receiving the first segment or the second segment when the second element is placed relative to the first element with said gap therebetween,
   wherein the first and second segments are initially two distinct pieces, the bar further comprising a coupler for assembling the first and second segments, and
   wherein the first segment of the bar is embedded in a concrete region of the first element, and the coupler comprises:
      a threaded coupling terminating the first segment of the bar in line with the face of the first element; and
      a thread formed on the second segment of the bar, said thread being engaged in the threaded coupling in order to join the first and second segments of the bar.

2. The method according to claim 1, in which a sealing product which is hardenable is injected into the channel after the bar is tensioned in order to make the bar adhere to walls of said channel.

3. The method according to claim 1, in which one of the first and second segments of the bar is embedded in a concrete region of the first or second element, and the other segment of the bar is fitted into said channel when the second element is placed relative to the first element with said gap therebetween.

4. The method according to claim 1, in which the segment of the bar received in said channel has a threaded end opposite to the other segment of the bar among the first and second segments, said threaded end being accessible after the second element is fitted and receiving a nut for assembling the first and second elements.

5. The method according to claim 4, in which the threaded end is accessible in a niche formed in a wall of the element comprising said channel, said wall being adjacent to said gap.

6. The method according to claim 5, in which a sealing product which is hardenable is injected into the channel and into the niche after the bar is tensioned in order to make the bar adhere to the element having said channel among the first and second element and to at least partially fill in the niche by coating the nut and the threaded end of the segment of the bar.

7. The method according to claim 1, in which the tensioning of the bar comprises applying a tensile force to at least one end of the bar.

8. The method according to claim 7, in which the bar has at least one threaded end and the tensile force is applied by tightening a nut on said threaded end.

9. The method according to claim 1, in which the first and second elements are fastened by the bar, the tensioning of the bar further comprising applying a compression force which acts to widen said gap.

10. The method according to claim 9, in which the spacer comprises a chamber in which a fluid is injected under pressure in order to apply said compression force when the bar is tensioned.

11. The method according to claim 1, in which at least part of the interface product is placed in said gap while the second concrete element is being placed relative to the first element with said gap therebetween.

12. A method for erecting a structure comprising a first element and a second element, the first and second elements being prefabricated concrete elements, the method comprising:

obtaining the first element;

placing the second element with at least one spacer maintaining a gap between a face of the first element and a face of the second element;

tensioning at least one bar fastened to the first and second elements and passing through the gap maintained by the spacer, and putting an interface product which is hardenable in said gap, wherein the first and second elements are fastened by the bar, the tensioning of the bar further comprising applying a compression force which acts to widen said gap, and wherein the spacer comprises a chamber in which a fluid is injected under pressure in order to apply said compression force when the bar is tensioned.

13. A method for erecting a structure comprising a first element and a second element, the first and second elements being prefabricated concrete elements, the method comprising:

obtaining the first element;

placing the second element with at least one spacer maintaining a gap between a face of the first element and a face of the second element;

tensioning at least one bar fastened to the first and second elements and passing through the gap maintained by the spacer, and putting an interface product which is hardenable in said gap, wherein the bar comprises a first segment extending in the first element and a second segment extending in the second element, at least one of said first and second elements comprising a channel which leads to the face thereof, said channel receiving the first segment or the second segment when the second element is placed relative to the first element with said gap therebetween, and wherein a sealing product which is hardenable is injected into the channel after the bar is tensioned in order to make the bar adhere to walls of said channel.

14. A method for erecting a structure comprising a first element and a second element, the first and second elements being prefabricated concrete elements, the method comprising:

obtaining the first element;

placing the second element with at least one spacer maintaining a gap between a face of the first element and a face of the second element;

tensioning at least one bar fastened to the first and second elements and passing through the gap maintained by the spacer, and putting an interface product which is hardenable in said gap, wherein the bar comprises a first segment extending in the first element and a second segment extending in the second element, at least one of said first and second elements comprising a channel which leads to the face thereof, said channel receiving the first segment or the second segment when the second element is placed relative to the first element with said gap therebetween, and wherein one of the first and second segments of the bar is embedded in a concrete region of the first or second element, and the other segment of the bar is fitted into said channel when the second element is placed relative to the first element with said gap therebetween.

\* \* \* \* \*